No. 656,111. Patented Aug. 14, 1900.
F. HALL.
WHEEL AND AXLE.
(Application filed Oct. 23, 1899.)
(No Model.) 2 Sheets—Sheet 1.

Witnesses.
Harry Kilgore
F. D. Merchant

Inventor.
Frank Hall,
By his Attorney,
Jas. F. Williamson

THE NORRIS PETERS CO., PHOTO-LITHO., WASHINGTON, D. C.

No. 656,111.
F. HALL.
WHEEL AND AXLE.
(Application filed Oct. 23, 1899.)
(No Model.)
Patented Aug. 14, 1900.
2 Sheets—Sheet 2.
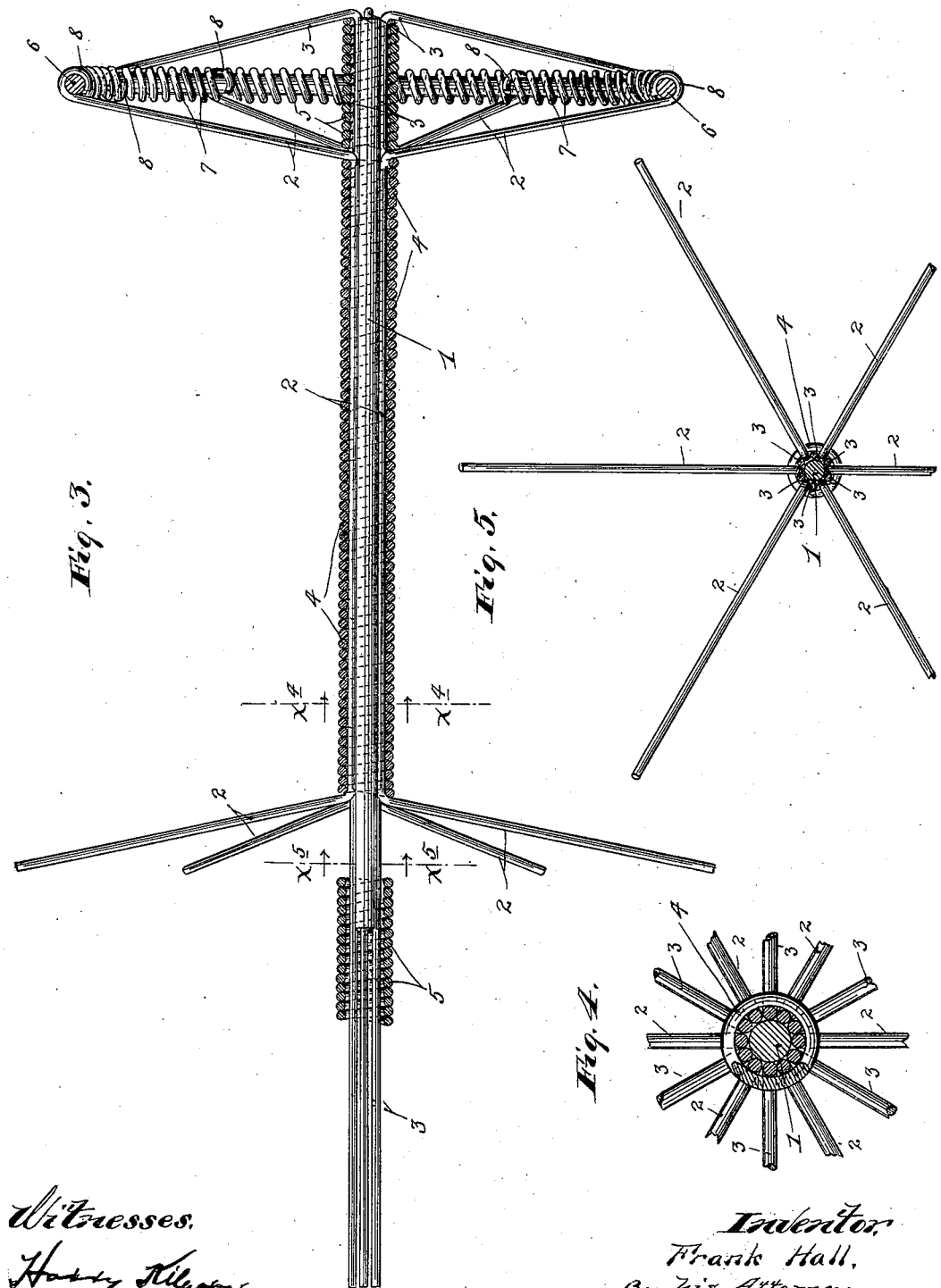
Witnesses.
Harry Kilgore.
F. D. Merchant.
Inventor,
Frank Hall,
By his Attorney,
Jas. F. Williamson

UNITED STATES PATENT OFFICE.

FRANK HALL, OF MINNEAPOLIS, MINNESOTA, ASSIGNOR, BY DIRECT AND MESNE ASSIGNMENTS, OF THREE-FOURTHS TO GUSTAV ELFSTRAND, C. B. SHOVE, AND CHARLES J. HEDWALL, OF SAME PLACE.

WHEEL AND AXLE.

SPECIFICATION forming part of Letters Patent No. 656,111, dated August 14, 1900.

Application filed October 23, 1899. Serial No. 734,550. (No model.)

*To all whom it may concern:*

Be it known that I, FRANK HALL, a citizen of the United States, residing at Minneapolis, in the county of Hennepin and State of Minnesota, have invented certain new and useful Improvements in Wheels and Axles; and I do hereby declare the following to be a full, clear, and exact description of the invention, such as will enable others skilled in the art to which it appertains to make and use the same.

My present invention has for its special object to provide a simple, cheap, and durable axle, with attached wheels, particularly adapted for use in the running-gear of baby-carriages, doll-carriages, go-carts, toy wagons, &c.; and to this end it consists of the novel devices and combinations of devices hereinafter described, and defined in the claims.

The invention is illustrated in the accompanying drawings, wherein like characters indicate like parts throughout the several views.

Figure 1:
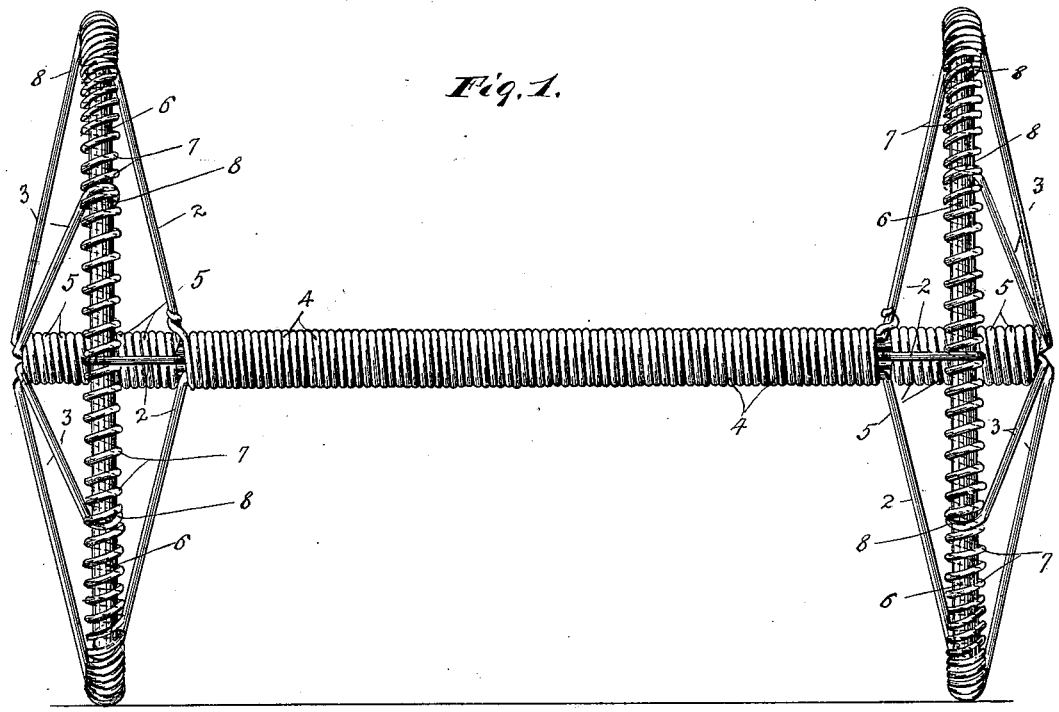
Figure 2:
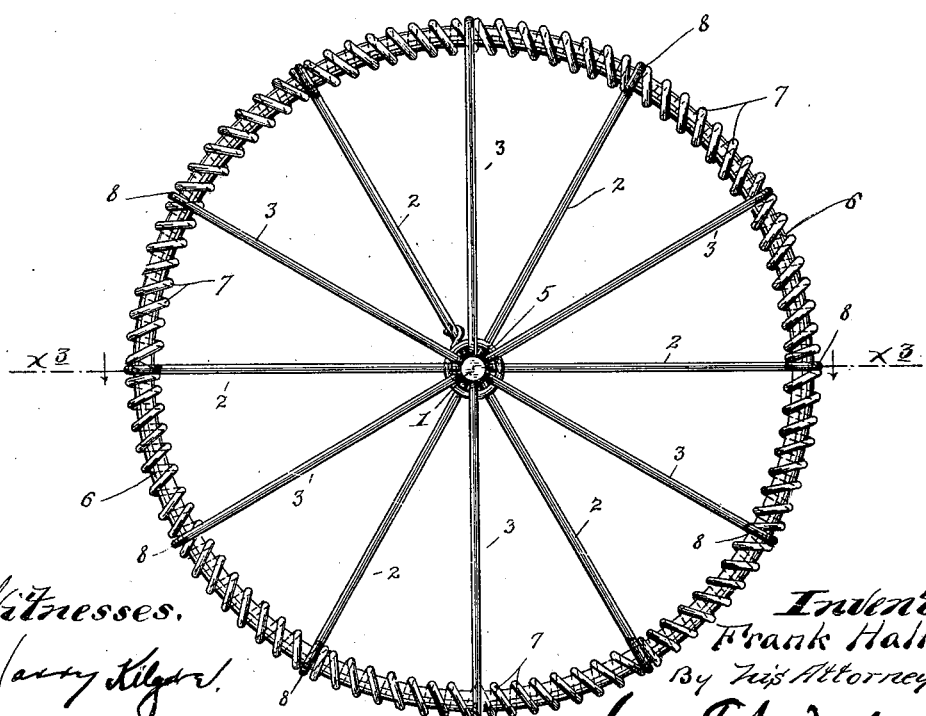

Figure 1 is a plan view of a completed axle with attached wheels. Fig. 2 is an end elevation of the same. Fig. 3 is a horizontal section taken approximately on the line $x^3 x^3$ of Fig. 2, one end of the axle and one wheel being shown as but partially completed. Fig. 4 is a transverse vertical section taken on the line $x^4 x^4$ of Fig. 3, some parts being broken away; and Fig. 5 is a transverse vertical section taken on the line $x^5 x^5$ of Fig. 3, some parts being broken away.

The numeral 1 indicates a shaft which constitutes the core of the axle.

The numerals 2 and 3 indicate the alternate members of a plurality of relatively-light rods or wires as compared with the shaft 1, which rods or wires are placed in parallel arrangement longitudinally of the shaft 1 in close contact, so as to completely surround the said shaft, as best shown in Fig. 4. As shown there are twelve of these rods or wires, or, in other words, there are six of the wires 2 and six of the wires 3; but this number may of course be varied at will.

A coiled spring or wire wrapping 4 is wound around the wires or rods 2 3, as best shown in Figs. 1 and 3. This coiled-wire wrapping 4 terminates at its ends considerably short of the ends of the shaft or core 1, and just outward of the ends of said coil 4 the wires or rods 2 are bent outward, so as to form the inner spokes of the wheels.

While the wires or rods 3 are yet straight, short wire coils 5 are slipped over the ends of the same, as indicated at the left in Fig. 3, and are forced inward against the inner portions of the inner spokes of the wheel, which, as just noted, are formed by the outwardly-bent portions of the wires 2. When the short coils 5 are properly positioned, as indicated at the right in Fig. 3 and at both ends in Fig. 1, their outer ends are approximately even with the outer ends of the shaft 1. After the short coils 5 are properly positioned the outer ends of the wires or rods 3 are bent outward to form the outer spokes of the wheels, and when this is done the said coils 5 are secured in position. Preferably the long intermediate coil 4 is so tightly wound around the intermediate portions of the wires 2 and 3 that the shaft or core 1 will be securely clamped in working position and held against accidental displacement.

The wheel-rims 6 are preferably round in cross-section, and on the same are wound or coiled spring-like wire coverings 7. The outer ends of the spokes formed by the bent outer sections of the wires 2 and 3 are bent around the wheel-rims 6, as shown at 8, and by this latter operation the completed axle, with attached wheels, is finished. In some instances the shaft or core 1 may not be considered necessary, in which case it may be driven out of the coils 4 and 5, and the axle will be strong and durable even after this is done. However, the shaft or core gives the axle greatly-increased rigidity or stiffness, and as it adds but little to the cost of the device is advisably and usually employed as a permanent part of the axle.

The axle, with attached wheels, constructed on the above plan gives a structure of small cost and of great durability. The fact that there are no separable or removable parts used to connect the wheels to the axle makes the same very desirable for use in connection with all toy vehicles, baby-carriages, &c.

It is the usual practice to mount the bearings for the axle on the ends of the intermediate coil 4, and these bearings may be placed in working position either before or after the axle and wheels are completed, according to the nature of the said bearings. It would, however, be possible to remove the shaft or core 1 and mount the hollow axle to run loosely on a spindle or shaft passed therethrough, or it would also be possible to extend the shaft or core 1 so as to receive the bearings outside of the wheels. Other modifications may be also made within the scope of my invention.

The expression "axle" as used in the specification and in the claims does not of itself and without more specific expressed limitations imply a complete axle—that is, an axle to which both of the wheels are made rigid.

What I claim, and desire to secure by Letters Patent of the United States, is as follows:

1. An axle, having a plurality of longitudinally-extended rods or wires turned at their ends to form the spokes of connected wheels, substantially as described.

2. The combination with an axle having a plurality of longitudinally-extended rods or wires turned at their ends to form the spokes of connected wheels, of wheel-rims around which the ends of the spokes are bent to complete the wheels, substantially as described.

3. An axle comprising a plurality of longitudinally-extended rods or wires in cylindrical arrangement, with their ends turned to form the spokes of connected wheels, and a spiral wrapping around said axle for binding together the said rods or wires thereof, substantially as described.

4. An axle comprising a central shaft or core, a plurality of longitudinally-extended rods or wires in cylindrical arrangement around said shaft or core, with their ends turned to form the spokes of connected wheels, and a spiral wrapping binding the said rods or wires to said shaft or core, substantially as described.

5. An axle comprising a plurality of longitudinally-extended rods or wires in cylindrical arrangement, with their ends turned to form the spokes of connected wheels, and a spiral wrapping around said axle for binding said rods or wires together, in combination with wheel-rims around which the outer ends of said spokes are bent to complete said wheels, substantially as described.

6. The combination with the rods or wires 2, 3, bent at their ends to form the wheel-spokes, as described, of the coiled wrapping 4 binding the parallel portions of said rods 2, 3, together, the end coils 5 on the rods 3 between the inner and the outer wheel-spokes, and the wheel-rims 6 around which the outer ends of the wheel-spokes are bent to complete the wheels, substantially as described.

7. An axle having a plurality of rods or wires extending lengthwise thereof and bent to form the spokes of a connected wheel, substantially as described.

In testimony whereof I affix my signature in presence of two witnesses.

FRANK HALL.

Witnesses:
M. M. McGRORY,
F. D. MERCHANT.